3,033,892
PREPARATION OF ORGANIC BORIC
ANHYDRIDES
Allen L. McCloskey, Orange, Calif., assignor to United States Borax & Chemical Corporation, Los Angeles, Calif., a corporation of Nevada
No Drawing. Filed Mar. 7, 1960, Ser. No. 12,913
4 Claims. (Cl. 260—462)

The present invention relates to a new continuous process for the preparation of glycol boric anhydrides.

The glycol borates will be found to have considerable and varied utility. They are used to produce resins, adhesives and coating compositions. In addition, they are also used as electrolytes in condensers, as anti-gumming agents in lubricating oil and as important chemical intermediates in the production of other organic compounds. However, in most of the uses of the glycol borates it is necessary to use them as the glycol boric anhydrides. Prior art processes for removing the water formed in the preparation of the glycol boric anhydrides have been costly, inefficient and difficult to perform in other than batch methods.

It is, therefore, the principal object of this invention to provide an economical and continuous method for the preparation of substantially water-free glycol boric anhydrides.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

Broadly stated, the present invention comprises a method for continuously producing glycol boric anhydrides which comprises simultaneously feeding a glycol monoborate and an azeotroping agent to a fractionating column, said glycol monoborate having the general formula:

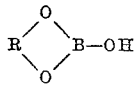

where R is an alkylene radical of 2 to 3 carbon atoms in length and containing from 2 to 10 carbon atoms, said azeotroping agent being inert to glycol boric anhydrides and capable of forming an azeotrope with water having a constant boiling point below about 200° C., establishing and maintaining a reflux ratio in said column such that the azeotroping agent and azeotrope of water are removed from the top of said column and substantially water-free glycol boric anhydride is removed from the bottom of said column.

The following list is illustrative of 1,2 and 1,3 glycol monoborates which are applicable to the present process:

Ethanediol 1,2 monoborate
Propanediol 1,2 monoborate
Propanediol 1,3 monoborate
Butanediol 1,3 monoborate
Butanediol 2,3 monoborate
2 methyl pentanediol 2,4 monoborate (hexylene glycol monoborate)
2,2,4 trimethyl pentanediol 1,3 monoborate.

The following list is illustrative of azeotroping agents which are capable of forming an azeotrope with water which azeotrope has a constant boiling point below about 200° C.:

Toluene
Benzene
Cyclohexane
3-pentanone
Xylene

In the preferred embodiment of the invention, I use toluene and hexylene glycol monoborate (2 methyl pentanediol 2,4 monoborate).

Thus, while in the following examples only toluene and hexylene glycol monoborate are used for illustrative purposes, it is only necessary to merely substitute in their stead any of the defined azeotroping agents and/or any of the glycol monoborates to achieve comparable results.

The following examples were performed in an apparatus consisting of sections of one inch Oldershaw sieve tray fractionating columns, the total number of trays being thirty. Feed inlets were supplied at tray #10 and tray #5 where the glycol monoborate and azeotroping agent, respectively, were fed to the fractionating column. The feed reservoirs were heated, calibrated, addition funnels, and once equilibrium was developed in the fractionating column the rate from these addition funnels or feed reservoirs remained constant. A constant lever reboiler constructed from a 200 ml. round-bottomed flask was attached to the bottom of the column and drained into a calibrated receiver. The temperatures were controlled by a Gardsman I-P temperature controller.

I

The feed to the column consisted of 173 grams per hour of hexylene glycol monoborate at tray #10 and 692 grams per hour of toluene at tray #5, both being preheated to about 80° C. The reboiler temperature was set at 205° C. and the column was run for two consecutive hours without interruption. Samples were taken every thirty minutes and a composite sample was taken at the conclusion of the run. Analysis yielded the following data:

Percent water in thirty minute samples=range 0.1 to 0.5%
Percent water in composite sample=0.26%

II

The feed to the column consisted of 144 grams per hour of hexylene glycol monoborate at tray #10 and 576 grams per hour of toluene at tray #5, both being preheated to 65° C. The reboiler temperature was set at 205° C. and the column was run for four consecutive hours without interruption. Samples were taken every thirty minutes and a composite sample was taken at the conclusion of the run. Analysis yielded the following data:

Percent water in thirty minute samples=range 0.0 to 0.15%
Percent water in composite sample=0.07%

III

The feed to the column consisted of 144 grams per hour of hexylene glycol monoborate and 576 grams per hour of toluene in a single solution fed at tray #10. The solution was preheated to 65° C. and the reboiler temperature was set at 205° C. The column was run for four consecutive hours without interruption and samples were taken every thirty minutes and a composite sample was taken at the conclusion of the run. Analyses yielded the following data:

Percent water in thirty minute samples=range 0.02 to 0.28%
Percent water in composite sample=0.12%

From the foregoing description it will be seen that the process is applicable to continuous operation and that the product yielded is substantially free from water.

I, therefore, particularly point out and distinctly claim as my invention:

1. The method of continuously producing glycol boric anhydrides which comprises simultaneously feeding a glycol monoborate and an azeotroping agent to a fractionating column, said glycol monoborate having the general formula

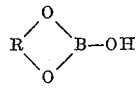

where R is an alkylene radical of 2 to 3 carbon atoms in length and containing from 2 to 10 carbon atoms said azeotroping agent being inert to glycol boric anhydrides and capable of forming an azeotrope with water having a constant boiling point below about 200° C., establishing and maintaining a reflux ratio in said column such that the azeotroping agent and azeotrope of water are removed from the top of the column and substantially water-free glycol boric anhydride is removed from the bottom of said column.

2. The method of claim 1 wherein the glycol monoborate is hexylene glycol monoborate and the azeotroping agent is toluene.

3. The method of continuously producing glycol boric anhydrides which comprises feeding a glycol monoborate having the general formula:

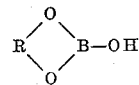

where R is an alkylene radical of 2 to 3 carbon atoms in length and containing from 2 to 10 carbon atoms, to an intermediate portion of a fractionating column while simultaneously feeding to the column, at a point below said intermediate feed point, an azeotroping agent inert to glycol boric anhydride and capable of forming an azeotrope with water which has a constant boiling point below about 200° C., establishing and maintaining a reflux ratio in the fractionating column such that the azeotrope of water and azeotroping agent is removed from the top of the column and substantially water-free glycol boric anhydride is removed from the bottom of the fractionating column.

4. The method of claim 3 where said azeotroping agent is toluene and the glycol monoborate is hexylene glycol monoborate.

References Cited in the file of this patent

UNITED STATES PATENTS

| | | |
|---|---|---|
| 2,741,548 | Darling et al. | Apr. 10, 1956 |
| 2,813,115 | Bragdon | Nov. 12, 1957 |